3,026,240
CHEMICAL RECOVERY SYSTEM
Robert E. Matty, Alliance, Ohio, assignor to The Babcock & Wilcox Company, New York, N.Y., a corporation of New Jersey
Filed May 4, 1959, Ser. No. 810,764
3 Claims. (Cl. 162—36)

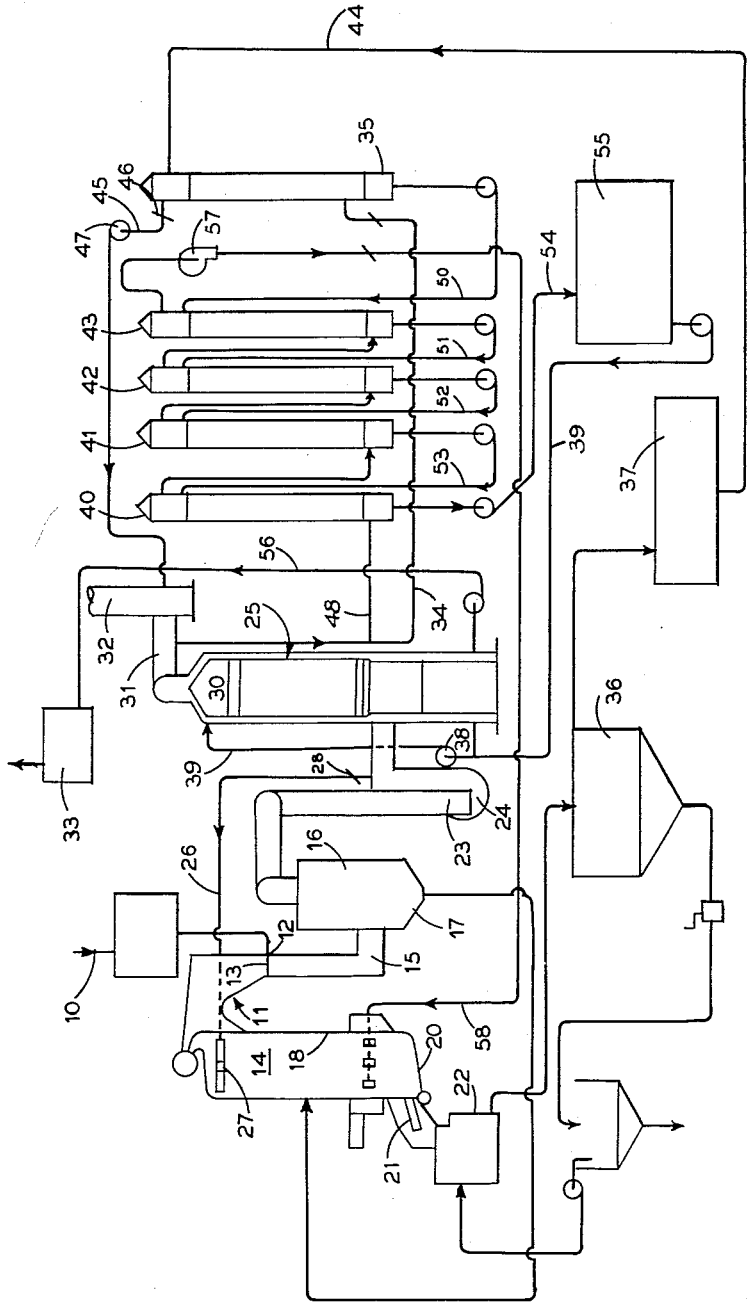

The present invention relates to the recovery of chemicals from the residual liquor of a pulp digestion process utilizing sodium or potassium salts of sulphurous acid alone or in combination with other constituents such as sodium or potassium carbonates or sulphur dioxide, and more particularly to an improvement in the process disclosed in U.S. Patent 2,788,273.

In the chemical pulping of wood chips, or the like, the digestion of the chips is intended to soften or remove the organic constituents which tend to bind the cellulose fibers together. Various sodium sulphur compounds may be used as cooking agents under suitable temperatures and pressures with the pulp thereafter separated from the residual liquor including spent cooking agents and the organic matters removed from the cellulose fibers. The chemicals in the residual liquor may be recovered for reuse in the cooking process with a minimum loss of the chemicals. The chemical recovery is accomplished by incinerating concentrated residual liquor so that the organic matter in the liquor is burned and the heat therefrom utilized to convert the inorganic chemicals to a molten smelt containing sodium sulphur compounds.

Following the smelting process in a furnace particularly designed and constructed to perform the incinerating process, the gases may be utilized to concentrate the residual liquor prior to its incineration, with the gases thereafter passed to a sulphiting tower for the removal of the $SO_2$ from the gases. The molten smelt from the furnace is dissolved in a water solution to form green liquor, clarified and thereafter passed to carbonation towers for the removal of the sulphur compounds from the dissolved smelt.

As disclosed in U.S. Patent 2,788,273, the carbonation of the so-called green liquor is accomplished generally according to the following formula:

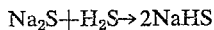

$$Na_2S + H_2S \rightarrow 2NaHS$$

Another reaction which might occur to a small extent and involving the interactions with $CO_2$ might be as follows:

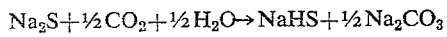

$$Na_2S + \tfrac{1}{2}CO_2 + \tfrac{1}{2}H_2O \rightarrow NaHS + \tfrac{1}{2}Na_2CO_3$$

In the patented process the precarbonation of the liquor is accomplished by the use of hydrogen sulphide where a sufficient amount of hydrogen sulphide is passed through the precarbonation tower so that substantially none of the hydrogen sulphide is discharged from the tower. However, the sulphide content of the liquor leaving the precarbonation tower is increased by the sulphur from the hydrogen sulphide, and the carbonation towers of the following portion of the liquor treatment process must reconvert the sulphur contents of the green liquor to hydrogen sulphide by contact with gases containing carbon dioxide. The hydrogen sulphide resulting from the liquor and gas contact in the carbonation towers is thereafter introduced into the furnace for burning to sulphur dioxide.

In accordance with the present invention, substantially sulphur-free gases containing carbon dioxide are passed directly in controlled amounts to the precarbonation tower so that the chemical conversion will be in accordance with the formula

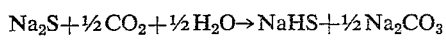

$$Na_2S + \tfrac{1}{2}CO_2 + \tfrac{1}{2}H_2O \rightarrow NaHS + \tfrac{1}{2}Na_2CO_3$$

With this improved process, the sulphur load delivered to the carbonation towers in the liquor is approximately ⅓ less than the sulphur load delivered to the towers according to the process of said patent. Under these circumstances, the carbonation towers of the present invention have approximately 50% more capacity than the corresponding carbonation towers of the patent. Thus, according to this invention, the towers utilized for carbonating the precarbonated liquor may be considerably smaller than in the process of the patent, so that not only will the capital charges of the installation be less, but the operating cost of the process of the present invention will be less than that of the patent.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

The single sheet of the drawings diagrammatically illustrates an arrangement of apparatus for performing the process of the present invention.

As shown in the drawing, partially concentrated residual liquor obtained from the digestion process of wood chip pulping is pumped at superatmospheric pressure through a pipe 10 to a venturi scrubber 11. The partially concentrated liquor is sprayed by nozzles 12 into the throat 13 of the venturi scrubber to intimately contact the hot gases leaving a furnace 14 wherein concentrated liquor is incinerated. The intimate contact between the liquor and the hot gases evaporates moisture from the liquor in moving through a duct 15 to a cyclone separator 16 so that the concentration of the liquor collected in the bottom 17 of the cyclone separator will have sufficient solids therein so that the liquor may be burned under self-sustaining combustion conditions in the furnace 14.

The furnace 14 disclosed in the drawing is of the general type shown in U.S. Patent 2,879,838. As shown, and described in said patent, the residual liquor is sprayed into the furnace so as to contact the walls 18 confining the incineration zone. The liquor is partially dehydrated in transit across the furnace, accumulates on the walls 18 of the furnace and after dehydration falls to the hearth 20 of the furnace where it is heated by the consumption of the organic matter therein under reducing conditions to form a smelt of the inorganic chemicals. The smelt is discharged through a spout 21 at the lower end portion of the hearth 20 and is delivered to a dissolving tank 22 where the smelt is dissolved in water to form green liquor. The green liquor is primarily composed of sodium carbonate, sodium sulphide and sodium sulphate, and is passed from the dissolving tank through a clarifier 36 for the removal of insoluble dregs and delivered to a green liquor storage tank 37. As shown, the dregs from the clarifier may be water washed with the dregs discharged to the sewer while the weak wash water is delivered to the dissolving tank 22 for liquid makeup.

The gaseous products of combustion rising through the furnace 14 may be contacted by additional combustion air and/or other gases to complete the combustion of the combustibles in the gases and to control the temperature of the gases entering the venturi, and are thereafter passed through the venturi and cyclone separator previously described. The gases of combustion leaving the furnace 14 will contain carbon dioxide and sulphur dioxide, in addition to suspended solids which may be entrained with the gases.

The venturi scrubber 11, with is cyclone separator 16, effectively removes the entrained solid matter in the gases of combustion so that the reduced temperature gases entering the inlet 23 of an induced draft fan 24 and thereafter discharged to a sulphiting tower 25 consist primarily of carbon dioxide, oxygen, sulphur dioxide and nitrogen.

It is sometimes desirable to introduce recirculated gases into the upper portion of the incinerating zone of the furnace to regulate the temperature of the gases leaving the furnace and entering the venturi scrubber 11. For this purpose, a recirculated gas conduit 26 connects the discharge side of the induced draft fan with a series of ports 27 positioned in the upper portion of the furnace. The flow of such gases is regulated by means of a damper 28 positioned in the conduit 26.

The sulphiting tower 25 is provided with a suitable packing, such as Raschig rings, for effective contact between liquid and gases passing through the tower. The sulphur dioxide containing gases are introduced into the intermediate portion of the tower with the gases discharging from a centrally positioned upper outlet 30 which is connected by a duct 31 to the stack 32 for discharge of gases to the atmosphere. Carbonated liquor is introduced into the upper portion of the tower from a carbonated liquor storage tank 55 by means of a pump 38 and connecting piping 39. The liquid and gas contact occurs by countercurrent flow through the sulphiting tower. The sulphited liquor obtained from the lower portion of the tower is passed to a cooking liquor storage tank 33 by a transfer pipe 56 and further treated, as desired, to form the cooking liquor used in the digestion process.

The gases leaving the sulphiting tower 25 are divided into three streams for controlled flow to different parts of the apparatus. Some of the carbon dioxide containing gases are passed through a valved conduit 34 to a precarbonation tower 35, a further portion of the carbon dioxide containing gases are passed through a valved conduit 48 for series flow through carbonating towers 40, 41, 42 and 43, while the remaining portion of the gases discharge through stack 32 to the atmosphere. The flow of gases to the precarbonation tower and to the carbonating towers is controlled as hereinafter described to accomplish the desired purposes.

The precarbonation and carbonation towers are suitably packed with, for example, Raschig rings or the like to effect intimate contact between a liquid gravitationally passed through each of the towers and an ascending stream of reactive gases.

The carbon dioxide gases delivered to the precarbonation tower 35 passes upwardly through the tower in counter-current relationship to the green liquor which is pumped through a pipe 44 from the tank 37. The flow of gases to the tower is controlled in quantity so as to avoid the release of hydrogen sulphide from the top of the tower. The gases leaving the tower are passed through a conduit 45 directly to the stack 32 for discharge to the atmosphere. It is important to so regulate the flow of gases through the conduit 34 to the precarbonation tower so as to avoid release of hydrogen sulphide through duct 45 and stack 32 to the atmosphere. This is accomplished by positioning a damper 46 in the duct 45 leading to an induced draft fan 47 in accordance with the presence or absence of hydrogen sulphide in the gases leaving the precarbonation tower 35. A hydrogen sulphide detector may be used to control the position of the damper 46 so that the presence of hydrogen sulphide in the gas passing through the duct 45 would tend to reduce the flow of gases to the tower until the detector found an absence of such gases. It is, of course, desirable to pass as large a quantity of carbon dioxide gas to the tower as possible so as to obtain the highest possible carbonation of the sodium sulphide in the liquor, without forming hydrogen sulphide. As an alternate control means, a pH detector may be inserted in the liquid effluent leaving the lower 35, and to regulate the damper 46 in response to changes in the pH from a selected value.

The partially carbonated liquor discharged from the bottom of the precarbonation tower 35 includes a mixture of sodium carbonate and sodium hydrosulphide and is pumped to the upper portion of the carbonation tower 43 through a pipe 50 and is thereafter passed in series through each of the towers 42, 41 and 40 by the transfer pipes 51, 52 and 53, respectively. The liquor leaving the tower 40 is pumped through a pipe 54 to a carbonated liquor storage tank 55 from which the liquor is withdrawn and pumped as needed through a pipe 39 to the sulphiting tower 25.

The carbon dioxide containing gases entering the tower 40 pass in countercurrent relationship to the downwardly flowing liquor, and thereafter is passed in series through each of the carbonation towers 41, 42 and 43. The contact between the carbon dioxide containing gases and the precarbonated liquor releases large quantities of hydrogen sulphide which are withdrawn from the tower 43 by means of an induced draft fan 57 and passed through a conduit 58 for discharge into the furnace 14. The hydrogen sulphide gases are burned in the furnace to convert the sulphur therein to sulphur dioxide, which will be utilized in the sulphiting tower 25.

As an example of the operation of the precarbonating tower 35 and the carbonating towers 40–43 inclusive, the green liquor passed through the pipe 44 will contain a mixture of 12 gram mols per minute of $Na_2S$ and 12 gram mols per minute of $Na_2CO_3$. In leaving the tower 35, the liquor composition will have been partially carbonated by absorption of $CO_2$ from the gases entering the tower through duct 34 to 18 gram mols per minute of $Na_2CO_3$ and 12 gram mols per minute of NaHS. Under chemically balanced conditions, the spent gases leaving the tower 35 will include 33 gram mols per minute of $O_2$ and $N_2$. Thus the reaction in tower 35 will follow the formula:

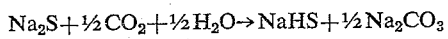
$$Na_2S + \tfrac{1}{2}CO_2 + \tfrac{1}{2}H_2O \rightarrow NaHS + \tfrac{1}{2}Na_2CO_3$$

The liquor leaving the precarbonation tower 35 passes sequentially through the carbonation towers 40–43 inclusive and is discharged to the storage tank 55 and contains 24 gram mols per minute of $Na_2CO_3$. To attain this carbonation of the liquid, the gases entering the tower 40 through the conduit 38 contains 12 gram mols per minute of $CO_2$ and the gas leaving tower 43 for discharge to the furnace 14 through the conduit 58 contains 12 gram mols per minute of $H_2S$ and 6 gram mols per minute of $CO_2$. Thus one-third of the total gases used for carbonation is passed to the precarbonation tower 35 while the remaining two-thirds of the gases pass through the towers 40–43 inclusive.

Thus, only two-thirds of the amount of gases required for carbonation of the liquor are passed through the carbonation towers in the present invention as compared with full gas flow in U.S. Patent 2,788,273 with a corresponding increase in the capacity of the towers of the present invention.

It will be understood that potassium may be substituted for sodium in the above described process. With such a substitution in the process, the reaction in the tower 35, for example, would then follow the formula:

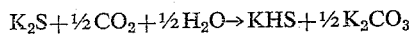
$$K_2S + \tfrac{1}{2}CO_2 + \tfrac{1}{2}H_2O \rightarrow KHS + \tfrac{1}{2}K_2CO_3$$

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a system for the recovery of chemicals in the residual liquor resulting from the digestion of cellulosic materials in a cooking liquor containing sodium salts of sulphurous acid in which the residual liquor is concentrated and incinerated to result in a smelt containing sodium sulphide and a gaseous product including sulphur dioxide and carbon dioxide, the smelt is dissolved to form an aqueous solution containing sodium sulphide and the gaseous product passed through a sulphiting zone in direct contact with a liquid containing sodium carbonate to produce the finished cooking liquor by absorption of the sulphur dioxide from said gaseous product, the improved method which comprises passing a portion of the gaseous product from said sulphiting zone through a precarbonation zone in contact with said dissolved smelt to convert said sodium sulphide to sodium carbonate and sodium hydrosulphide by absorption of the $CO_2$ from the gases, controlling the flow quantity of gases to said precarbonation step so that the gases leaving are substantially free of sulphur compounds, passing a second flow controlled portion of said gaseous product from said sulphiting zone through a carbonation zone in direct contact with the liquid from said precarbonation zone to convert said sodium compounds to carbonates of sodium with the release of $H_2S$ gas, and passing all the gases leaving the carbonation zone to the incinerating zone to convert the $H_2S$ gas to $SO_2$.

2. In a system for the recovery of chemicals in the residual liquor resulting from the digestion of cellulosic materials in a cooking liquor containing sodium salts of sulphurous acid in which the residual liquor is concentrated and incinerated to result in a smelt containing sodium sulphide and a gaseous product including sulphur dioxide and carbon dioxide, the smelt is dissolved to form an aqueous solution containing sodium sulphide and the gaseous product passed through a sulphiting zone in direct contact with a liquid containing sodium carbonate to produce the finished cooking liquor by absorption of the sulphur dioxide from said gaseous product, the improved method which comprises passing one portion of said sulphur dioxide free and carbon dioxide containing gaseous product to the atmosphere, passing a second portion of said carbon dioxide containing gaseous product through a precarbonation zone in contact with said dissolved smelt to convert said sodium sulphide to sodium carbonate and sodium hydrosulphide by absorption of the $CO_2$ from the gases, controlling the flow quantity of gases to said precarbonation step so that the gases leaving are substantially free of sulphur compounds, and passing a third portion of said carbon dioxide containing gaseous product through a carbonation zone in direct contact with the liquid from said precarbonation zone and in controlled quantity to convert said sodium compounds to carbonates of sodium with the release of $H_2S$ gas, and passing all the gases leaving the carbonation zone to the incinerating zone to convert the $H_2S$ gas to $SO_2$.

3. In a system for the recovery of chemicals in the residual liquor resulting from the digestion of cellulosic materials in a cooking liquor containing potassium salts of sulphurous acid in which the residual liquor is concentrated and incinerated to result in a smelt containing potassium sulphide and a gaseous product including sulphur dioxide and carbon dioxide, the smelt is dissolved to form an aqueous solution containing potassium sulphide and the gaseous product passed through a sulphiting zone in direct contact with a liquid containing potassium carbonate to remove the sulphur dioxide from said gaseous product, the improved method which comprises passing a controlled quantity portion of said gaseous product from said sulphiting zone through a precarbonation zone in contact with said dissolved smelt to convert said potassium sulphide to potassium carbonate and potassium hydrosulphide by absorption of the $CO_2$ from the gases, passing a second flow controlled portion of said gaseous product from said sulphiting zone through a carbonation zone in direct contact with the liquid from said precarbonation zone to convert said potassium compounds to potassium salts of sulphurous acid with the release of $H_2S$ gas, and passing all of the gases leaving the carbonation zone to the incinerating zone to convert the hydrogensulphide to $SO_2$.

References Cited in the file of this patent

UNITED STATES PATENTS 2,788,273　　Shick　_____ Apr. 9, 1957